O. T. EDDY.
Coffee Pot.

No. 25,495.

Patented Sept. 20, 1859.

Witnesses:

Inventor:
Oliver T. Eddy

UNITED STATES PATENT OFFICE.

OLIVER T. EDDY, OF PHILADELPHIA, PENNSYLVANIA.

COFFEE-POT.

Specification of Letters Patent No. 25,495, dated September 20, 1859.

*To all whom it may concern:*

Be it known that I, OLIVER T. EDDY, of the city and county of Philadelphia and State of Pennsylvania, have invented a new and useful Improvement in Coffee-Pots; and I do hereby declare the following to be a full, clear, and exact description of the same, reference being had to the accompanying drawing and to the letters of reference marked therein.

My invention consists in an annular cone shaped deflecting plate resting on the bottom of a pot and arranged in respect to a cone shaped tube and a perforated plate, substantially as hereinafter set forth.

The object of my invention is to cause a continual circulation of water upward through the cone shaped tube and downward through the perforated plate on which the ground coffee is placed, so that the latter may be effectually deprived of its soluble properties with which the water becomes impregnated, and so that the solution may be thoroughly filtered without the application of isinglass or other matter used in ordinary coffee pots for purifying purposes.

In order to enable others to make and use my invention, I will now proceed to describe its construction and operation.

Figure 1:
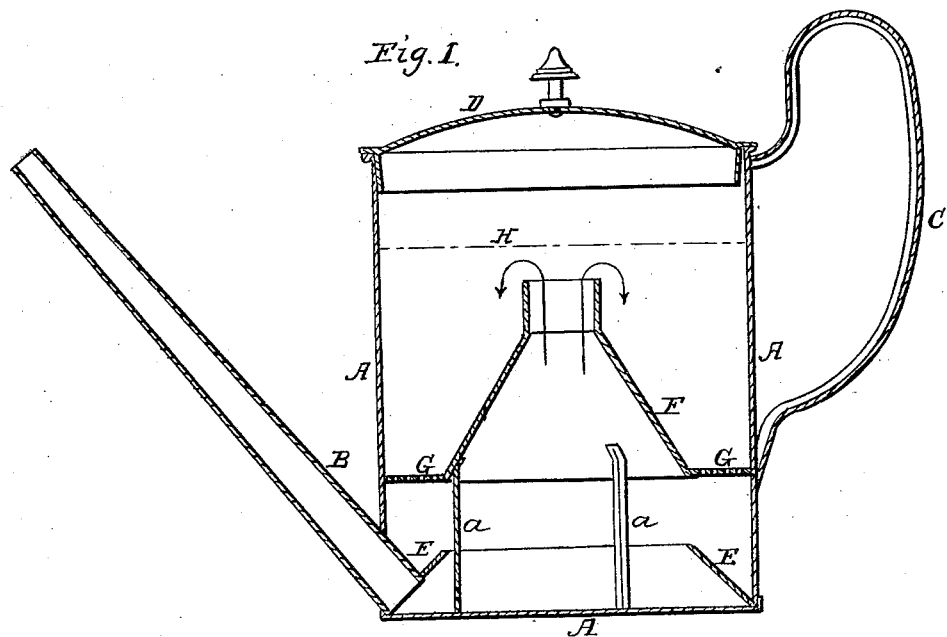
Figure 2:
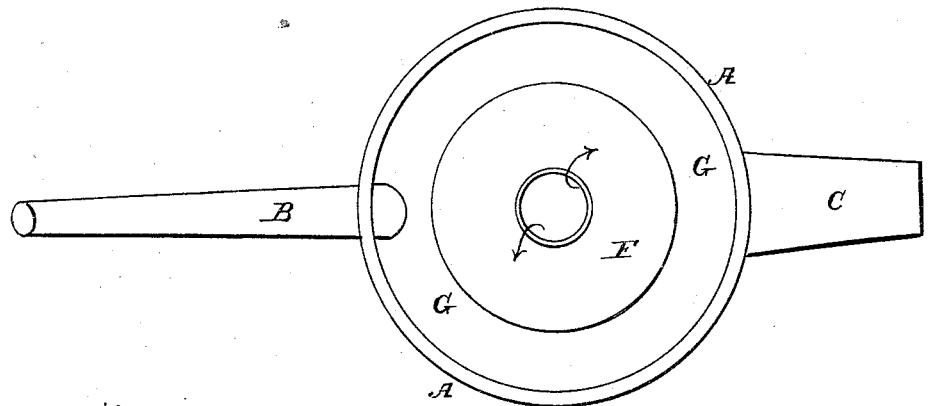

On reference to the accompanying drawing which forms a part of this specification—Figure 1, is a sectional elevation of my improved coffee pot. Fig. 2, a plan view with the cover removed.

A is the body, B the spout, C the handle, and D the cover of my improved coffee pot, on the bottom of which rests the lower edge of the annular cone shaped plate E, having an opening at the top of the same diameter or thereabout as the lower opening of the cone shaped tube F, which is supported on legs *a a* resting on the bottom of the pot so as to be elevated a short distance above the annular plate E. To the lower edge of the cone shaped tube F, is secured an annular plate G, extending to the sides of the pot and perforated with a series of small holes. The ground coffee is placed on this perforated plate and water poured into the pot until it reaches a height represented by the line H, which is above the top of the cone shaped tube F. The vessel is then placed over the fire. The steam generated near the bottom of the vessel and within the annular plate E, is so deflected by the latter that it cannot pass through the perforations of the plate G, but is directed toward the lower opening of the cone shaped tube F, and passes upward through the latter, the volume of the steam being contracted as it ascends the tube. Simultaneously with the ascent of the steam through this tube, a column of water will pass in the same direction, the water outside of the tube passing downward through the perforations of the plate G, to be reheated on the bottom of the vessel and again forced upward, so that a constant circulation of steam and boiling water is maintained, upward through the tube F, and downward through the perforated plate G. As this continuous stream of boiling water passes through the ground coffee, it is evident that the latter must be rapidly and effectually deprived of all its soluble properties, with which the water will become impregnated.

Whatever particles of coffee or refuse matter may pass through the perforations of the plate G they will subsequently be forced upward with the steam and water through the tube F and finally be deposited on the top of the lees, so that the above described circulation of water caused by the submerged tube, not only serves to extract the soluble properties of the coffee, but in connection with the perforated plate G, serves to filter the impregnated water as effectually as isinglass, eggs, or other artificial appliances used in ordinary coffee pots for the same purpose.

I claim as my invention and desire to secure by Letters Patent—

The annular cone shaped deflecting plate E, resting on the bottom of the pot, and arranged in respect to the tube F, and perforated plate G, substantially as set forth and for the purpose specified.

In testimony whereof, I have signed my name to this specification in the presence of two subscribing witnesses.

OLIVER T. EDDY.

Witnesses:
 HENRY HOWSON,
 CHARLES D. FREEMAN.